Figure 5:
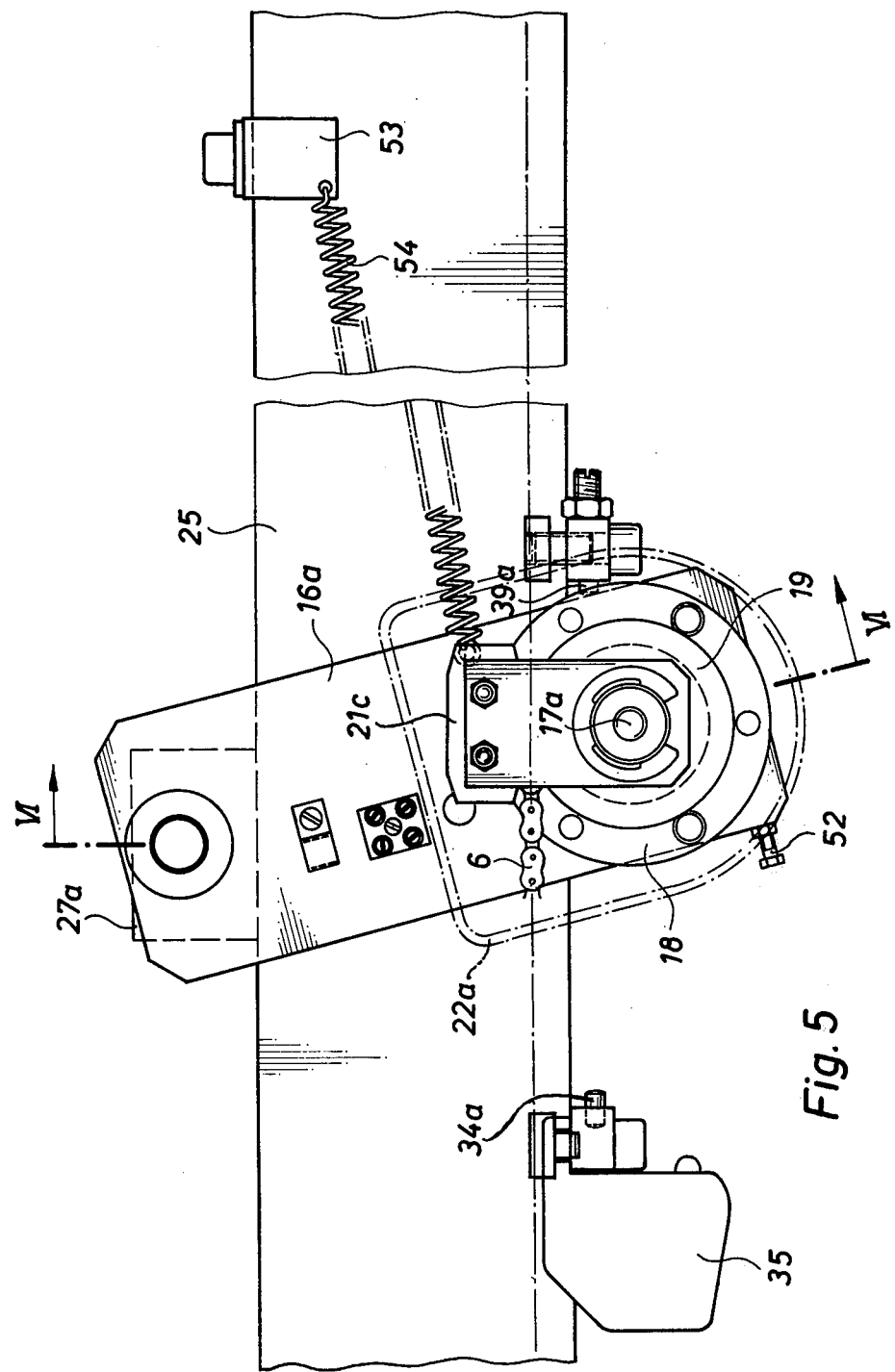

United States Patent [19]
Scheler

[11] 3,874,520
[45] Apr. 1, 1975

[54] APPARATUS FOR FEEDING AN ELONGATE WORKPIECE TO A MACHINE TOOL

[75] Inventor: Holger Scheler, Kiel, Germany

[73] Assignee: Firma Hermann Traub, Reichenbach (Fils), Germany

[22] Filed: Oct. 30, 1973

[21] Appl. No.: 411,298

[30] Foreign Application Priority Data
Nov. 17, 1972 Germany............................ 2256357

[52] U.S. Cl........................ 214/1.5, 82/2.5, 82/2.7, 198/221, 200/47
[51] Int. Cl............................................ B23b 13/00
[58] Field of Search ....... 198/221, 203, 40, 37, 110, 198/111, 112; 214/1.1, 1.5; 82/2.5, 2.7; 200/33 C, 33 D, 47, 61.13, 61.41, 61.42, 61.43

[56] References Cited
UNITED STATES PATENTS
3,137,485   6/1964   Johnson et al...................... 198/221
3,602,075   8/1971   Waefler................................. 82/2.5

FOREIGN PATENTS OR APPLICATIONS
1,777,170   9/1971   Germany............................. 82/2.7

Primary Examiner—Richard A. Schacher
Assistant Examiner—Jeffrey V. Nase
Attorney, Agent, or Firm—Roylance, Abrams, Berdo & Kaul

[57] ABSTRACT

Apparatus for sequentially feeding work material bars to a machine tool comprises a conveyor member which may be driven towards or away from the machine tool. A control member controls the machining operation and is connected to the conveyor member through a slipping clutch which the conveyor member supports. This control member acts on various limit switches to control the machining operation and the successive feeding of workpieces in bar form.

6 Claims, 6 Drawing Figures

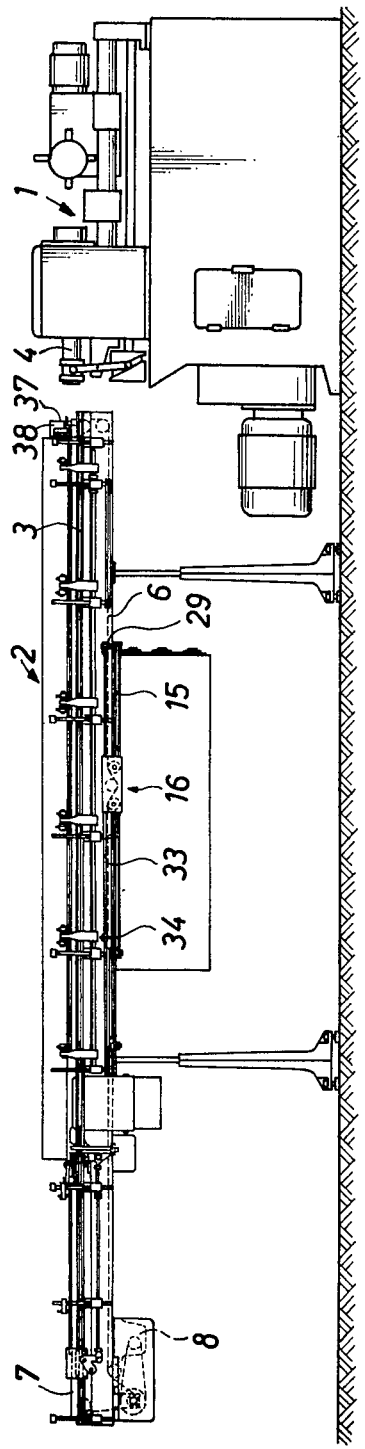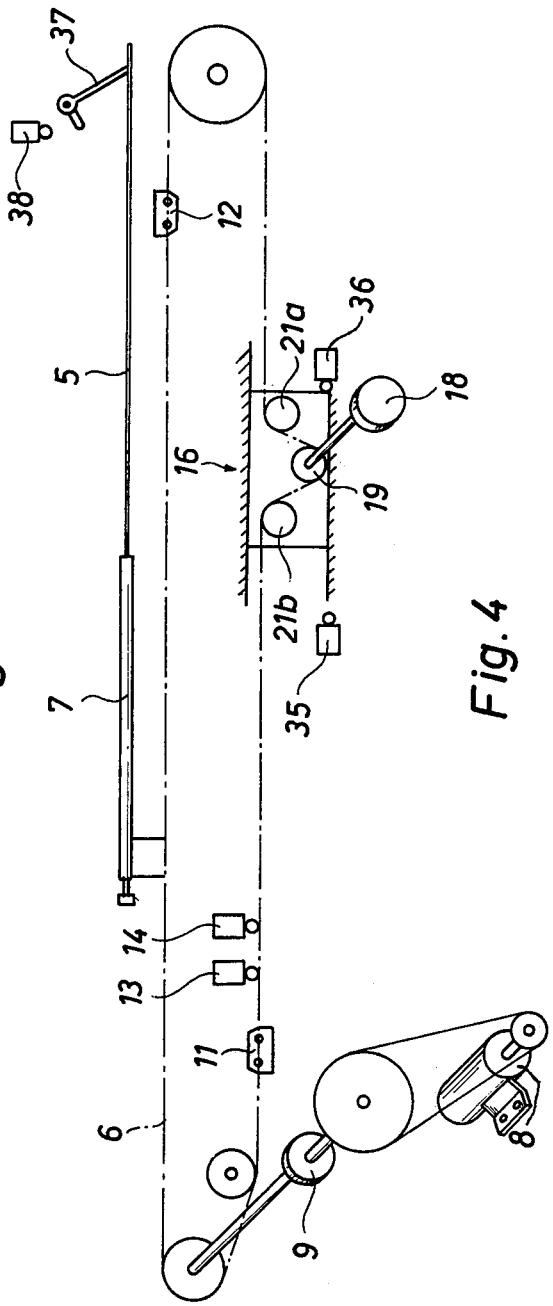
Fig. 1
Fig. 4

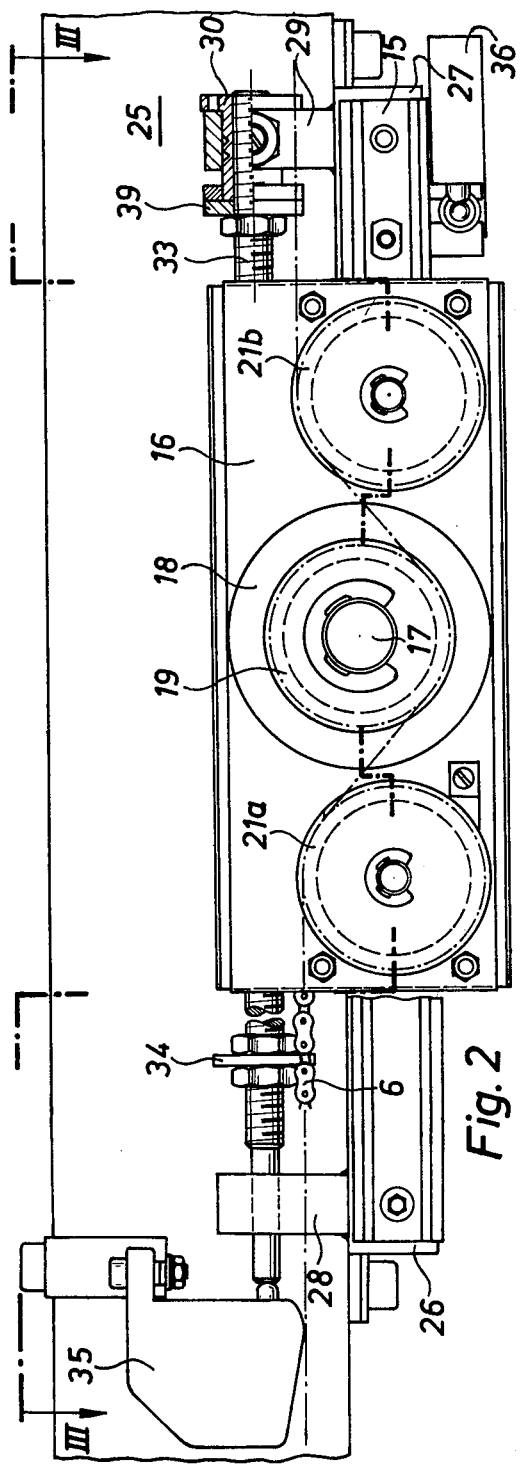
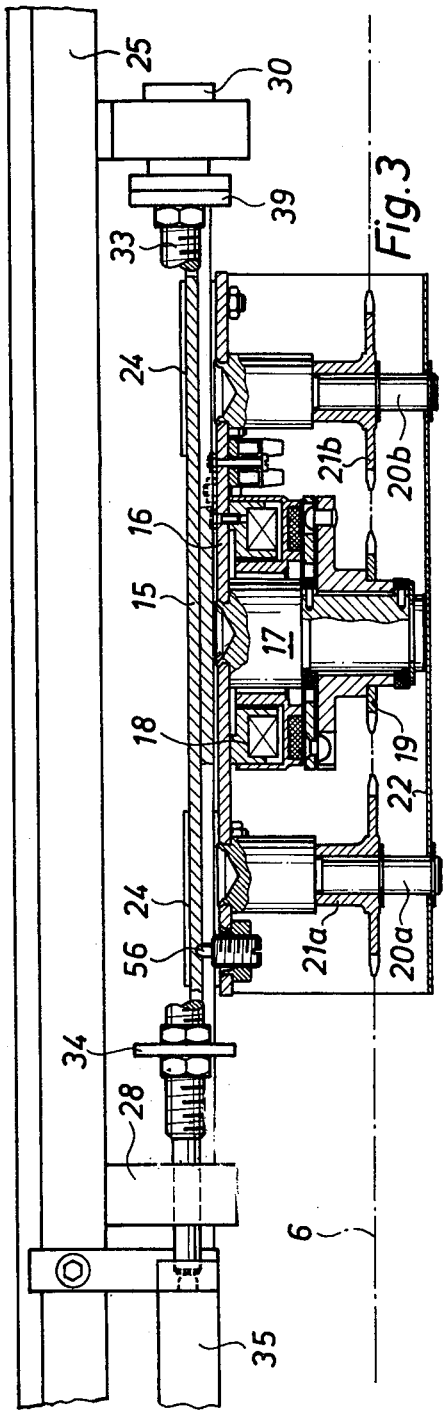
Fig. 2
Fig. 3

APPARATUS FOR FEEDING AN ELONGATE WORKPIECE TO A MACHINE TOOL

The invention relates to an apparatus for the feed of elongate workpieces, such as bars, to a machine tool. The machine tool may be a rotary lathe, for example.

A known apparatus of this type comprises a control member in the form of a control cam, mounted on a control chain, which is disposed in the vicinity of a conveying chain for the workpieces. A coupling is arranged between two coaxially disposed shafts of guide wheels for the conveying chain and control chain. The utilisation of a control chain together with a conveying chain is extremely expensive and requires additional space for the accommodation of the control chain and of the members cooperating with the control cam (German Patentschrift No. 1777170).

An object of the present invention is to provide a short and space-saving connection between the conveyor member and the control member with the lowest possible expenditure.

To this end the present invention provides apparatus for feeding an elongate workpiece to a machine tool comprising a conveyor member arranged for displacement in a feed direction, a connecting rod disposed so as to contact the workpiece in operation and connected to the conveyor member, a control member, a coupling supported on the control member, first switch means for actuating the coupling to connect the control member to the conveyor member in one position of the control member, second switch means for deactuating the coupling to disengage the control member from the conveyor member in another position of the control member, and means for moving the control member from the second to the first position. Owing to the extremely short connection between the control member and the conveyor member, which may be achieved with the invention, special members, which imitate the movement of the conveyor member or which are driven in accordance with this movement, may be eliminated. Since the member, intended for the movement of the control member, which is to be driven in accordance with the conveyor member and is to be synchronised with the movement thereof, is omitted, substantial reduction of the expenditure required to attain movement of the control member in conformity with the movement of the conveyor member, as well as a great saving of space, may be attained.

In a further development of the invention, wherein the conveyor member is constructed as a conveyor chain, a chain sprocket wheel meshing with the conveyor chain is mounted on the control member, the coupling is disposed between the chain wheel and the control member and a chain guide member is associated with the chain wheel. This results in an advantageous embodiment of the apparatus when a chain is utilised as the conveyor member for the workpiece.

In order that the invention may be more clearly understood, one embodiment of the invention will now be described, by way of example, with reference to the accompanying drawings in which:

FIG. 1 shows a side view of a rotary automatic lathe provided with feed apparatus according to the invention, FIG. 2 is a part of the embodiment of FIG. 1 in greater detail, FIG. 3 is a section, taken along the line III—III of FIG. 2, FIG. 4 is a diagrammatic illustration of the feed apparatus shown in FIG. 1, FIG. 5 shows a view, corresponding to FIG. 2, of part of a second embodiment or feed apparatus.

Figure 6:
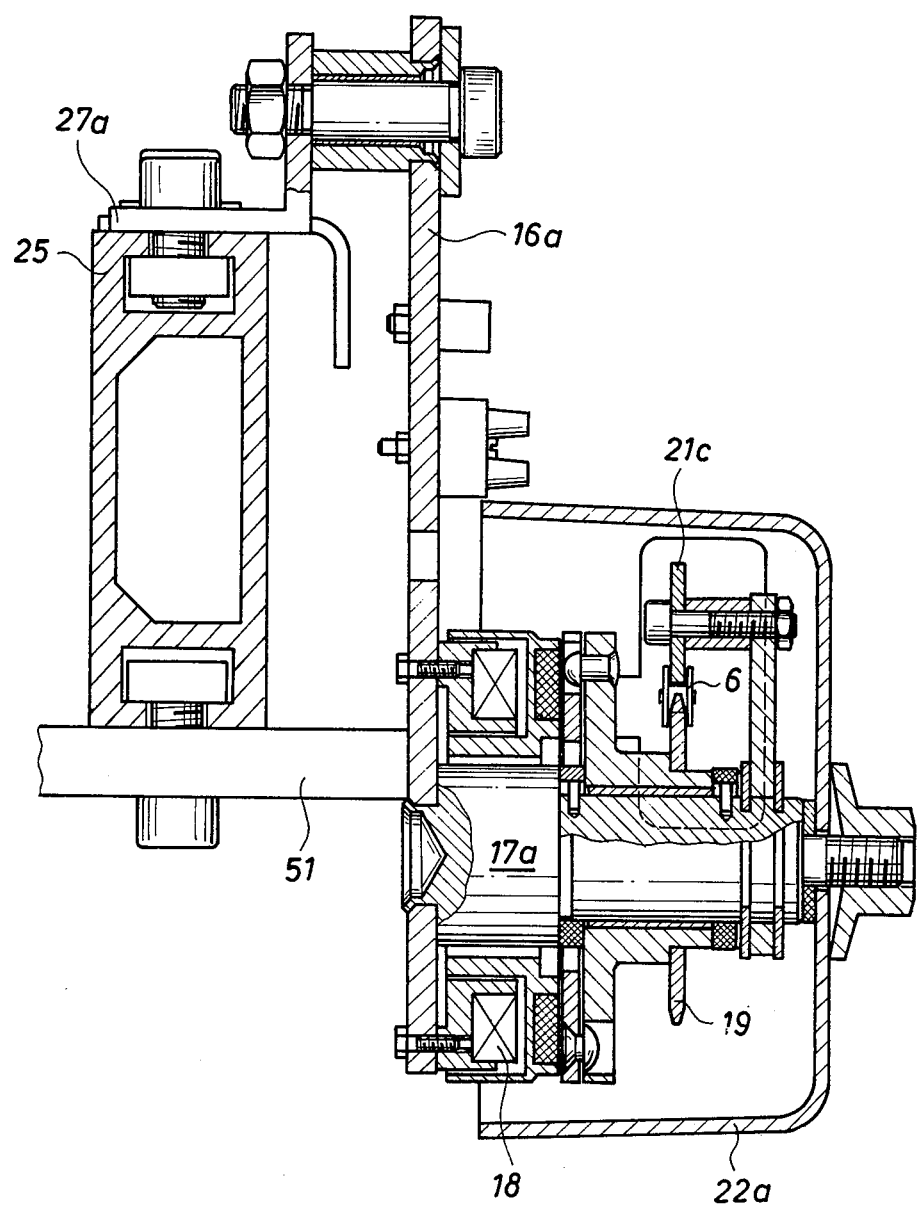

FIG. 6 is a section, taken along line VI—VI of FIG. 5, but on a different scale.

Referring to FIG. 1, apparatus for the feed of workpieces in bar form, which is indicated generally by the reference numeral 2 and will subsequently be referred to as the bar loading magazine or magazine base is associated with a single spindle rotary automatic lathe 1. The magazine 2 incorporates a guide channel 3 which is disposed coaxially to the main spindle 4 of the lathe 1. A work material bar 5, which is shown in FIG. 4 and which is located in the guide channel 3, is displaceable in the direction of the lathe 1 by means of a connecting rod 7. This rod 7 is joined to an endless conveyor chain 6 and is capable of displacement in the guide channel 3. The conveyor chain 6 can be driven in two opposite directions through a slipping clutch 9. Two control cams 11 and 12 are mounted on the conveyor chain 6 and cooperate with two control switches 13 and 14 mounted on the frame of the magazine 2 (FIG. 4).

A slide bar 15, shown in FIGS. 1 and 3, is secured on the lower surface of the bar magazine 2, and a control member 16, constructed as a slidable member in the form of a plate, is slidably displaceable on the bar 15. A graduated bearing pin 17 is riveted to the control member 16. A switch coupling 18, shown in FIGS. 2–4 and which is capable of magnetic actuation, includes a stationary part which is secured to the control member 16 and a movable part which is connected, in a manner preventing rotation, to a chain wheel 19 positioned on the bearing pin 17 so as to be capable of rotation between two thrust bearing rings. These rings are also held in a manner preventing rotation, and the wheel is held in its axial position by a spring ring.

As shown in FIG. 3, bearing pins 20a and 20b, which are axially longer than the bearing pin 17 and are also riveted to the control member 16, are provided on opposite sides respectively of the bearing pin 17. Chain wheels 21a, 21b are respectively rotatably mounted on the bearing pins 20a and 20b and are secured in their axial positions my means of spring rings. A covering plate 22 is applied to one end of each of the bearing pins 20a, 20b respectively, which projects beyond the chain wheels 21a or 21b respectively, and is secured in each case by means of a spring ring, which abuts the face of the bearing pin 17 in its central region.

As shown in FIG. 3, on the side of the control member 16, remote from the chain wheel 19, guide members 24 are mounted above and below each of the two ends. The guide members, which are in each case opposed to each other at the ends of the control member 16, have a wedge-shaped indentation on each of their adjacent surfaces, this indentation being complementary to the wedge-shaped upper or lower surface of the sliding bar 15 of U-shaped cross section. The conveyor chain 6 is received above the chain wheels 21a and 21b and below the chain wheel 19.

As best seen in FIGS. 2 and 3, the magazine 2 comprises a longitudinally extending support 25 having two angled members 26 and 27. The bar 15 and two bearing blocks 28 and 29 are secured to the angled members 26 or 27 respectively. A stop bush 30 is mounted in the bearing block 29, which is capable of displacement into two different stop positions and may be secured in each respective stop position by a stop mechanism. A switch rod 33 is screwed into the stop bush 30 and is secured by means of a nut. A locating member 39, cooperating with the control member 16, is secured between the stop bush 30 and a securing nut. The end of the switch rod 33 remote from the stop bush 30 is constructed as a smooth end member and is displaceably mounted in the bearing block 28. In the vicinity of the bearing block 28, the switch rod 33 supports an adjustable locating body 34, which is secured between two nuts and cooperates with the adjacent surface of the control member 16.

As shown in FIGS. 2 and 4, a switch 35, which can be actuated by the end of the switch rod 33, which is capable of displacement in the bearing block 28, is secured on the longitudinal support 25 by means of an angled member. An end sensor 36 is adjustably secured below the bearing block 29 and below the sliding bar 15. On the end adjacent the lathe 1, a sensor member 37 cooperating with the front end of the work material bar 5 is mounted and serves to actuate a starter switch 38. The work material bar can be displaced by means of a drive motor 8. This drive motor is switched off by a control switch 13 actuated by a cam 11 when the connecting rod 7 has reached its rear-most end position. A control switch 14 actuated by a control cam 12 switches off the drive motor 8, which is driven in a different direction of rotation than previously, when the work material bar 5 has been consumed.

When the drive motor 8 displaces the work material bar 5 by means of the conveyor chain 6 in the direction of the lathe 1, the sensor member 37 is raised by the front end of the work material bar 5. This actuates the starter switch 38, to connect the coupling 18 to a source of power. As a result the chain wheel 19, which otherwise rotates freely on the bearing pin 17, is fixed in position. A frictional connection is thereby attained between the chain wheel 19 and the control member 16, which is moved along by the conveyor chain 6 from its first position to the left as shown in FIG. 4 to its second position. The control member 16 thereby moves from the locating member 39 to the locating body 34. When the control member 16 impinges on the locating member 34, the switch rod 33 is displaced from its first stop position into a second stop position, until the stop bush 30 is in contact with the bearing block 29. The switch rod 33 thereby actuates the end sensor 35, which emits an impulse for switching on the single spindle rotary automatic lathe 1. The interval between the two locating members 34 and 39 corresponds to the path travelled by the work material bar 5 after the sensor member 37 is actuated, until it reaches a predetermined position in the single spindle rotary automatic lathe a short distance behind the severing tool, so that the tip of the work material bar can be severed. A pin 56 (FIG. 3) is provided on the surface of the control member 16 adjacent to the longitudinal support 25 and is flexibly mounted in a threaded sleeve, which is screwed into the control member 16. In the initial position, in which the control member 16 has displaced the switch rod 33 towards the right by means of the locating member 39, this pin 56 engages in a recess disposed on the sliding bar 15, and together with the frictional force of the guide members 24 acting on the sliding bar 15, prevents the control members 16 being prematurely withdrawn from this initial position under the influence of the moving chain, when this is undesirable.

When the lathe 1 is switched on and has gripped the work material bar with its clamp which is located in the main spindle, the coupling 18 is separated from its source of power, so that the chain wheel 19 can again rotate freely on the bearing pin 17. The impulse for this operation is derived from the control of the lathe 1 itself.

When the work material bar 5 has been consumed, the lathe 1 is stopped from the tensioning mechanism in the open position. Both the coupling 18 and the drive motor 8 are then connected to a current source, and the drive motor 8 thereby withdraws the connecting rod 7 from the lathe 1. By means of the coupling 18, which has been actuated and connected to the bearing pin 17 in a manner preventing rotation, the control member 16 is taken back into its initial position. Shortly before it assumes the initial position, the control member 16 impinges on the locating member 39 and displaces the stop member 30 and consequently the switch rod 33 into the first stop position. The control member 16 actuates the end sensor 36, which separates the coupling 18 from its source of power. Thus the conveyor chain 6 can return completely to its initial position and a new work material bar can be inserted in the guide channel 3 of the bar loading magazine 2. The process described above is repeated for working the tip of the work material bar adjacent the single spindle rotary automatic lathe 1.

In the second embodiment according to FIGS. 5 and 6, members which are the same as in the first embodiment are designated by the same reference numerals, members which are equivalent in function but dissimilar in appearance are designated by the same reference numeral but with a small letter. In this case the control member 16a is constructed as a pivotal member which is capable of pivotal movement about a horizontal axis and is secured on the longitudinal support 25 of the bar loading magazine 2 by means of the angled member 27a. On its free end the control member 16a supports a further holder 21c between two axial stops, for securing the conveyor chain 6 on the chain wheel 19. A securing nut for a housing 22a in the form of a receptacle, which covers the chain wheel 19 and the switch coupling 18, is secured on the extended end of the bearing pin 17a. The locating body 34a and the locating body 39a are each adjustably secured by means of securing rods, whereof only the securing rod 51 is visible, on the lower surface of two longitudinal supports, disposed in parallel relationship to each other, whereof only the longitudinal support 25 is illustrated. On the left lower end of the control member 16a, shown in FIG. 5, an adjustable locating screw 52 is mounted, which cooperates with the switch 35 during the period in which the control member 16a cooperates with the locating members 34a and 39a. A tensile spring 54 is yoked in between the control member 16a and a securing member 53, attached on the longitudinal support 25, and urges the control member 16a into the position shown in FIG. 5.

The second embodiment is advantageous for bar loading magazines, in which the interval between a stop, capable of being pivoted out of the path of the work material bar and the cutting tool for working the front end of the work material bar is only slight, for example, when the closed work material tensioning mechanism serves as a stop.

A switch cycle mechanism mounted on the bar loading magazine 2, for control of the supply mechanism for the work material bar switches on the drive motor 8 after the insertion of a new work material bar into the guide channel 3, so that the connecting rod 7, mounted on the conveyor chain 6, and consequently the work material bar 5, move in the direction of the single spindle rotary automatic lathe 1, until the front end of the new work material bar comes to abut on the stop projecting into its path of displacement. When the drive motor 8 is switched on, a time switch member is simultaneously set in operation, its operating period being set in such a manner that the front end of the work material bar 5 must certainly come into contact with the stop before the fixed period expires. Whilst the front end of the work material bar 5 is in contact with the stop, the drive motor 8 remains switched on and consequently the gripping pincers on the connecting rod 7 are applied on the rearmost end of the work material bar. The slipping clutch 9, inserted between the drive motor 8 and the conveyor chain 6, then begins to slip until the period set for the time switch member has expired. On the expiring of the fixed period, the stop is withdrawn from the path of the work material bar. Furthermore, the single spindle rotary automatic lathe 1 is again connected to its source of power. The switch coupling 18 is at the same time connected to its source of power so that the chain wheel 19 is fixed on the bearing pin 17a and the control member 16a is taken along by the conveyor chain 6 in the direction of the stop 34a, in opposition to the action of the tensile spring 54. When the control member 16a is in contact with the stop 34a, the switch 35 is simultaneously actuated and imparts the stimulus to the switching cycle mechanism of the bar loading magazine 2 for initiation of the next part of the cycle. The machine tool has simultaneously gripped the work material bar, the front end of which has been brought into the cutting position, in its tensioning mechanism and the tip of the bar can be cut. The work pieces are subsequently machined off the bar. The switching cycle mechanism, which is switched to the next part of the cycle by the swtich 35 then gives the signal for disengaging the switch coupling 18 from its source of power so that the control member 16a is pivoted back, under the action of the tensile spring 54, into its position of rest, shown in FIG. 5, in which it is in contact with the locating body 39a.

During the production of machined work pieces from the work material bar, the switching cycle mechanism of the bar loading magazine is in the stand-by position until it receives a signal via the end of the work material bar, by means of which the main part of the work material bar, which has previously been worked, is then drawn out in the rearward sense and a new work material bar is inserted in the guide channel 3.

What is claimed is:

1. Apparatus for controlling a machine tool having an elongate workpiece fed thereto comprising:
   a magazine base supporting a workpiece;
   a conveyor member coupled to said base and arranged for movement in a first and second direction;
   a connecting rod coupled to said conveyor member and disposed to contact and move the workpiece toward the machine tool;
   a control member coupled to said base for movement between a first and second position by said conveyor member;
   coupling means supported on said control member for releasably coupling said control member and said conveyor member;
   first switch means coupled to said base for actuating said coupling means, upon movement of the workpiece by said connecting rod past a predetermined point, to couple said control member to said conveyor member while said control member is in said first position to thereby move said control member to said second position;
   second switch means coupled to said base for deactuating said coupling means and for actuating the machine tool when said control member has reached said second position; and
   means for moving said control member from said second position to said first position.

2. An apparatus according to claim 1, wherein
   said conveyor member is a chain, and
   said control member includes a chain wheel meshing with said chain and means for guiding said chain.

3. An apparatus according to claim 2, wherein
   said control member is slidably coupled to said base,
   said means for guiding includes two chain directing wheels disposed on opposite sides of said chain wheel, and
   said control member includes a switch rod engageable with said second switch means.

4. An apparatus according to claim 2, wherein
   said control member is pivotally coupled to said base, and
   said means for moving said control member from said second position to said first position is a spring coupled to said base and to said control member.

5. An apparatus according to claim 4, wherein
   said control member is a rocker arm, and
   said apparatus further includes two stops coupled to said base between which said control member pivots, one of said stops being adjustably coupled to said base and supporting said second switch means.

6. An apparatus for controlling a machine tool having an elongate workpiece fed thereto comprising:
   a base supporting a workpiece thereon;
   conveyor means coupled to said base for moving the workpiece toward a machine tool;
   a control member coupled to said base, for movement between a first and second position by said conveyor means;
   coupling means supported on said control member for releasably coupling said control member and said conveyor means;
   first switch means, coupled to said base, for actuating said coupling means, upon movement of the workpiece by said conveyor means past a predetermined point, to couple said control member to said conveyor means while said control member is in said first position to thereby move said control member to said second position;
   second swtich means, coupled to said base, for deactuating said coupling means and for actuating the machine tool when said control member has reached said second position; and
   means for moving said control member from said second position to said first position.

* * * * *